United States Patent
Jui-Chang et al.

(10) Patent No.: US 6,607,139 B1
(45) Date of Patent: Aug. 19, 2003

(54) MULTI-FUNCTION NETWORK CARD

(75) Inventors: Chen Jui-Chang, Hsinchu (TW); Chang Chien-Kuo, Hsinchu (TW); Lin Ming-Feng, Hsinchu (TW); Huang Chiao-Cheng, Hsinchu (TW)

(73) Assignee: ABOXOM Systems, Inc., Hsin-chu (TW)

(*) Notice: Subject to any disclaimer, the term of this patent is extended or adjusted under 35 U.S.C. 154(b) by 0 days.

(21) Appl. No.: 10/183,333

(22) Filed: Jun. 25, 2002

(30) Foreign Application Priority Data

Apr. 19, 2002 (TW) ........................ 91108174 A

(51) Int. Cl.[7] .................. G06K 19/06; G06K 7/00; G06F 13/00
(52) U.S. Cl. .................. 235/492; 235/486; 710/300
(58) Field of Search ................. 235/492, 486, 235/487; 710/8, 15, 16, 19, 100, 300, 301, 302, 303, 304; 713/300–340

(56) References Cited

U.S. PATENT DOCUMENTS

| | | | | |
|---|---|---|---|---|
| 5,548,782 A | * | 8/1996 | Michael et al. | 710/15 |
| 5,781,744 A | * | 7/1998 | Johnson et al. | 710/304 |
| 6,012,103 A | * | 1/2000 | Sartore et al. | 710/8 |
| 6,272,644 B1 | * | 8/2001 | Urade et al. | 713/320 |
| 6,308,239 B1 | * | 10/2001 | Osakada et al. | 710/316 |
| 6,389,495 B1 | * | 5/2002 | Larky et al. | 710/53 |
| 6,460,094 B1 | * | 10/2002 | Hanson et al. | 710/8 |

* cited by examiner

Primary Examiner—Thien M. Le
Assistant Examiner—April Nowlin
(74) Attorney, Agent, or Firm—Perkins Coie LLP

(57) ABSTRACT

A multi-function network card comprises a universal serial bus (USB) interface. A HUB or control circuit is coupled to the USB interface, the HUB or control circuit includes pluralities of ports formed thereon for connecting computer periphery device. A function control circuits is connected to the ports for driving the computer periphery device and pluralities of media attached units respectively are connected to the function control circuit for connecting the computer periphery device. Pluralities of sensor are respectively coupled to the function control circuit or the pluralities of media attached units, wherein the pluralities of sensor may detect whether the computer periphery device is connected or not; and a power control means is connected to the USB interface by a first terminal and connected to the function control circuit by a second terminal.

4 Claims, 1 Drawing Sheet ary Patent No. 91108174 filed on Apr. 19, 2002, which is
MULTI-FUNCTION NETWORK CARD

CROSS REFERENCE TO THE RELATED APPLICATIONS

This application claims the benefit of Taiwanese Patent Application No. 91108174 filed on Apr. 19, 2002, which is hereby incorporated by reference in its entirety.

TECHNICAL FIELD

The present invention relates to the means for network connection, and more specifically, to a multi-function network card for computer system.

BACKGROUND

In recent years, the computer and Internet technique are dramatically developed with a brisk step due to the improvement of the semiconductor industry, the computer and the communication techniques. The network card allows the user to connect to the bus of World Wide Web or network. Further, the various types of memory cards are popular in these years, such as credit card, bank card, ID card and so on. The memory card is also widely used due to the improvement of the semiconductor technology. The computer periphery devices are also popular for fetching the information via the network in the multi-media environment. The computer periphery devices include but not limited to the scanner, card reader, key board, mouse and so on. Card reader is one of the means for reading the information stored in the card. The card reader has a connector that is connected to the ICs. Based on the report, the memory card user population is dramatically increasing.

Up to now, the present network exhibits only one function and such means cannot provide pluralities of devices connected thereon. Namely, if the means connects to the A device and the user would like to use the B device, the user has to separate the A device first. Then, the user connects the B device, thereby driving the device B. It is very hard for the user to operate the two devices.

If there is a multi-function network card having universal serial bus (USB), the means allows the user to operate at least two devices without separating one of them. It is also easy for portable. However, the power consumption provided by the system USB interface is limited under the USB standard. The prior art adds additional power supply to overcome the problem. The cost is increased and further the prior art it is not convenient for portable.

What is need is to provide a multi-function network card.

SUMMARY

An object of the present invention is to provide a multi-function network card.

A multi-function network card has a universal serial bus (USB) interface. A HUB or control circuit is coupled to the USB interface, the HUB or control circuit includes pluralities of ports formed thereon for connecting computer periphery device. A function control circuits is connected to the ports for driving the computer periphery device and pluralities of media attached units respectively are connected to the function control circuit for connecting the computer periphery device. Pluralities of sensor are respectively coupled to the function control circuit or the pluralities of media attached units, wherein the pluralities of sensor may detect whether the computer periphery device is connected or not; and a power control means is connected to the USB interface by a first terminal and connected to the function control circuit by a second terminal.

A method for driving a multi-function network card, wherein the multi-function network card include ports for connecting devices, the method comprising:
   detecting the alternation of the status when a computer periphery device connecting to one of the ports by at least one of sensors;
   sending a changing signal to a power control means, the power control means determining the connecting status of the computer periphery device;
   detecting the power consumption of the computer periphery device base on a signal received by the power control means;
   distributing a power to the computer periphery device according to the received signal of the power control means;
   distributing the power to a corresponding control circuit for driving the computer periphery device;
   communicating a computer system and the computer periphery device with each other via a HUB and a USB interface.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION

Figure 1:
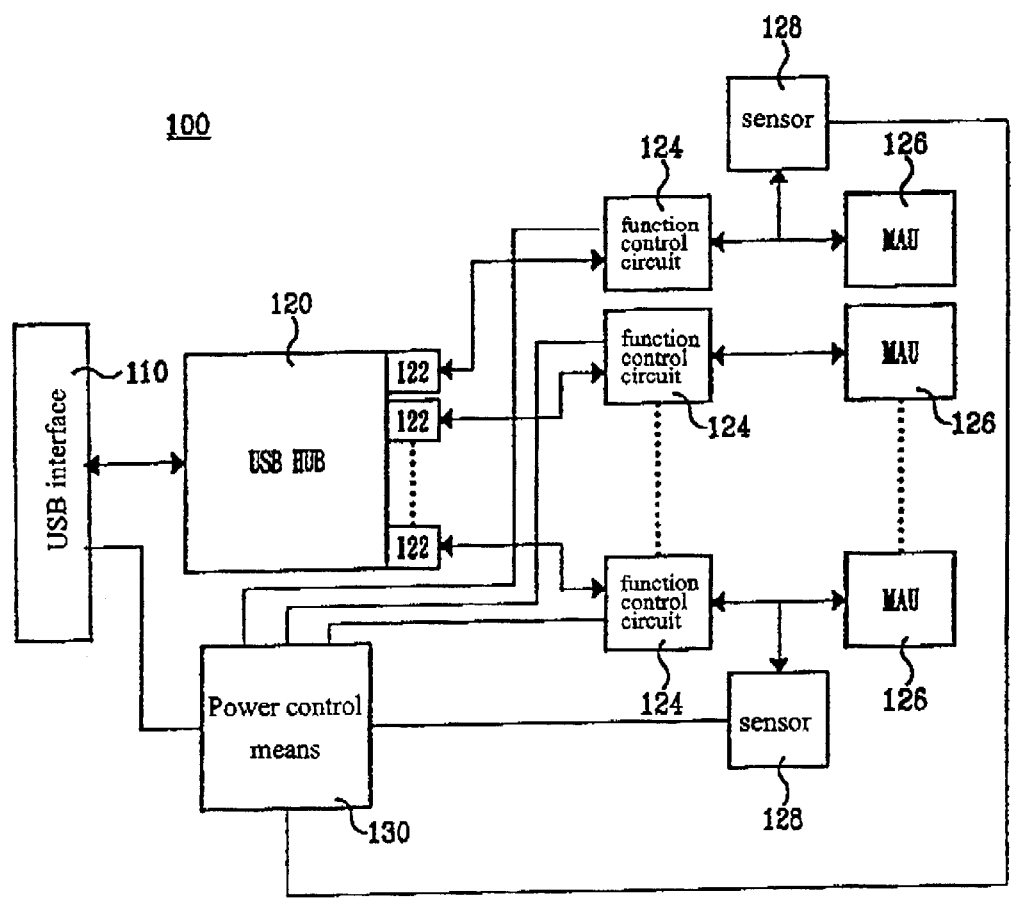
FIG. 1 is a functional diagram of the present invention.

The embodiments of the present invention will now be described in detail. Nevertheless, it should be noted that the present invention can be practiced in a wide range of other embodiments besides those explicitly described, and the scope of the present invention is expressly not limited except as specified in the accompanying claims. The present invention provides a multi-function network card that may connect at least two computer periphery devices without additional power source.

The present invention discloses multi-function network card. The present invention may connect at least two devices, with reference to the FIG. 1, it illustrates a functional block diagram for the present invention. The apparatus 100 includes a universal serial bus (USB) interface 110, and a HUB or control circuit 120 is coupled to the USB interface 110. The HUB or control circuit 120 includes pluralities of ports formed thereon for connecting devices. Each port 122 is connected to an associated function control circuit 124 for driving each computer periphery device. Pluralities of media attached units 126 are respectively connected to the control circuit 124 for connecting the computer periphery device. The computer periphery device includes but not limited to mouse, key board, scanner, floppy, Modem, PCMCIA, DVD, VCD, digital camera, printer.

Pluralities of sensor 128 are respectively coupled to the control circuit 124 or the media attached units 126. The sensor 128 may detect the computer periphery device is connected or not. A power control means 130 is connected to the USB interface 110 by first terminal and connected to the function control circuit 124 by another terminal.

When one computer periphery device is connected to the media attached unit 126, at least one of the sensors 128 may detect the alternation of the status, then followed by sending the changing signal to the power control means 130. The power control means 130 will determine the connecting status of the computer periphery device. Base on the power control means 130 may receive the signal, the power control means 130 may detect the power consumption of the devices. Subsequently, the power control means 130 will distribute the power to the device according to the data received by the power control means 130. The power distribution is dynamic and not all of the device will be driven at the same time. Under the determination, the power control means 130 distributes the power to the corresponding control circuit 124 for driving the device. The computer system and the computer periphery device communicate with each other via the HUB 120 and the USB interface 110. The computer system includes but not limited to the bench top computer, hand-held computer or notebook computer.

The present invention provides multi-function connection without additional power source, and the means is capable for portable.

As is understood by a person skilled in the art, the foregoing preferred embodiments of the present invention are illustrated of the present invention rather than limiting of the present invention. It is intended to cover various modifications and similar arrangements included within the spirit and scope of the appended claims, the scope of which should be accorded the broadest interpretation so as to encompass all such modifications and similar structure. Thus, while the preferred embodiment of the invention has been illustrated and described, it will be appreciated that various changes can be made therein without departing from the spirit and scope of the invention.

We claim:

1. A multi-function network card, comprising:

a universal serial bus (USB) interface;

a HUB or control circuit coupled to said USB interface, said HUB or control circuit including pluralities of ports formed thereon for connecting computer periphery device;

function control circuits connected to said ports for driving said computer periphery device;

pluralities of media attached units respectively connected to said function control circuit for connecting said computer periphery device;

pluralities of sensor respectively coupled to said function control circuit or said pluralities of media attached units, wherein said pluralities of sensor may detect whether said computer periphery device is connected or not; and a power control means connected to said USB interface by a first terminal and connected to said function control circuit by a second terminal.

2. The multi-function network card of claim 1, wherein said computer periphery device includes mouse, key board, scanner, floppy, Modem, PCMCIA, DVD, VCD, digital camera, printer.

3. A method for driving a multi-function network card, wherein said multi-function network card include ports for connecting devices, said method comprising:

detecting the alternation of the status when a computer periphery device connecting to one of said ports by at least one of sensors;

sending a changing signal to a power control means, said power control means determining the connecting status of said computer periphery device;

detecting the power consumption of said computer periphery device base on a signal received by said power control means;

distributing a power to said computer periphery device according to said received signal of said power control means;

distributing the power to a corresponding control circuit for driving said computer periphery device;

communicating a computer system and said computer periphery device with each other via a HUB and a USB interface.

4. The method of claim 3, wherein said computer periphery device includes mouse, key board, scanner, floppy, Modem, PCMCIA, DVD, VCD, digital camera, printer.

* * * * *

UNITED STATES PATENT AND TRADEMARK OFFICE
CERTIFICATE OF CORRECTION

PATENT NO. : 6,607,139 B1  Page 1 of 1
DATED : August 19, 2003
INVENTOR(S) : Jui-Chang et al.

It is certified that error appears in the above-identified patent and that said Letters Patent is hereby corrected as shown below:

<u>Title page,</u>
Item [75], Inventor, "Jui-Chang et al." should be -- Chen et al. --;
"Chen Jui-Chang" should be -- Jui-Chang Chen --;
"Chang Chien-Kuo" should be -- Chien-Kuo Chang --;
"Lin Ming-Feng" should be -- Ming-Feng Lin --; and
"Huang Chiao-Cheng" should be -- Chiao-Cheng Huang --;
Item [73], Assignee, "ABOXOM Systems, Inc." should be
-- ABOCOM Systems, Inc. --;

Signed and Sealed this

Twenty-third Day of March, 2004

JON W. DUDAS
*Acting Director of the United States Patent and Trademark Office*